J. LITTFIN.
Bob-Sled Runners.

No. 151,785. Patented June 9, 1874.

Witnesses.
C. Palmer
W. R. Kennedy

Inventor.
Johann Littfin

UNITED STATES PATENT OFFICE.

JOHANN LITTFIN, OF OSHKOSH, WISCONSIN.

IMPROVEMENT IN BOB-SLED RUNNERS.

Specification forming part of Letters Patent No. 151,785, dated June 9, 1874; application filed November 3, 1873.

*To all whom it may concern:*

Be it known that I, JOHANN LITTFIN, of Oshkosh, in the county of Winnebago and State of Wisconsin, have invented certain Improvements in Bob-Sled Runners, of which the following is a specification:

The nature of my invention consists in constructing an independent bob-sled runner of wood, in such a manner as to distribute the pressure of the load on the axle-tree of the sled over the whole length of the runner. This I accomplish by the use of a strong corbel fastened to the under side of the rave, into which and the runner the knees are framed, and the whole firmly fastened together with tie-rods or iron straps, forming, in effect, a vertical post-truss.

Figure 1:
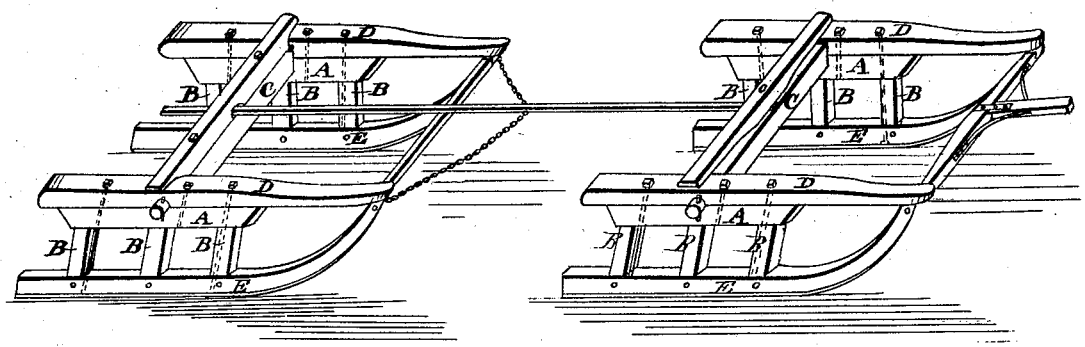
Figure 2:
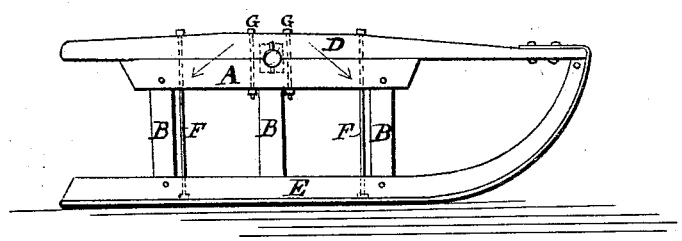
Figure 3:
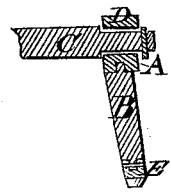

Figure 1 is an isometrical view of a pair of sleds constructed on my plan. Fig. 2 is a side elevation of the runner. Fig. 3 is a vertical transverse section through the axle-tree.

A is the corbel, fastened by bolts G G to the rave D. B B B are the knees framed into the corbel A and the runner E, and all bolted together by the tie-rods F F. These tie-rods are not claimed as an essential part of my invention, as the same purpose can be served by iron straps extending from the corbel to the runner, and firmly bolted thereto. The tenons of the knees are also pinned in the usual manner. C is the axle, resting in a journal-box formed half in the rave and half in the corbel, as seen in Fig. 2. The load resting on the axle C bears directly on the middle knee, and also, through the bolts G G, in connection with the transverse strength of the corbel itself, is transmitted in the direction of the arrow-heads to the outside knees, thus distributing the load over the whole runner, obviating the danger of a great strain occurring at a single point, by which the runner might be sprung, and the shoe cracked.

I do not claim an independent bob-sled runner as such; neither do I claim the tie-rods F F, as hereinbefore set forth.

Having thus described my invention, what I claim as new, and desire to secure by Letters Patent, is—

The corbel A, the rave D, the knees B B B, and runner E, all combined, substantially as and for the purposes specified.

JOHANN LITTFIN.

Witnesses:
  C. PALMER,
  W. R. KENNEDY.